(12) United States Patent
Findlay et al.

(10) Patent No.: US 8,989,674 B2
(45) Date of Patent: Mar. 24, 2015

(54) CELL MEASUREMENT DEVICE AND PROCESS

(75) Inventors: Stuart Findlay, Reading (GB); Michael Nosley, Reading (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 592 days.

(21) Appl. No.: 13/262,193

(22) PCT Filed: Mar. 25, 2010

(86) PCT No.: PCT/JP2010/055983
§ 371 (c)(1),
(2), (4) Date: Sep. 29, 2011

(87) PCT Pub. No.: WO2010/114081
PCT Pub. Date: Oct. 7, 2010

(65) Prior Publication Data
US 2012/0034878 A1 Feb. 9, 2012

(30) Foreign Application Priority Data
Mar. 30, 2009 (GB) .................................. 0905395.0

(51) Int. Cl.
*H04B 17/00* (2006.01)
*H04W 36/00* (2009.01)
*H04W 24/10* (2009.01)

(52) U.S. Cl.
CPC .......... *H04W 36/0088* (2013.01); *H04W 24/10* (2013.01); *H04W 36/0061* (2013.01)
USPC ........ 455/67.11; 455/447; 455/444; 455/436; 455/450; 455/63.1; 455/435.2; 455/442; 455/439; 455/453; 455/437; 370/331; 370/252; 370/464; 370/450; 370/555.1

(58) Field of Classification Search
USPC ................. 455/67.11, 447, 444, 436, 450, 62, 455/63.1, 435.2, 442, 439, 453, 443, 437; 370/331, 252, 464, 450, 555.1, 553.1
See application file for complete search history.

(56) References Cited

U.S. PATENT DOCUMENTS 5,854,981 A * 12/1998 Wallstedt et al. ............. 455/439
6,201,968 B1   3/2001 Ostroff et al.
(Continued)

FOREIGN PATENT DOCUMENTS

CN       1568028 A       1/2005
EP       1 962 535 A1    8/2008
(Continued)

OTHER PUBLICATIONS

Communication dated Oct. 23, 2013, issued by the State Intellectual Property Office of the People's Republic of China in corresponding Application No. 201080014096.7.
(Continued)

*Primary Examiner* — Ganiyu A Hanidu
(74) *Attorney, Agent, or Firm* — Sughrue Mion, PLLC

(57) ABSTRACT

A cellular communications system is described in which a mobile cellular device can, if necessary, obtain cell measurements for cells contained within a first cell list after it has received a second cell list. The mobile device then reports the cell measurements for cells within both lists so that a best candidate cell is less likely to be discarded in a cell handover procedure. A network node is also disclosed that can receive cell measurements for cells within a first cell list after the node has issued a second cell list. The node then uses the received cell measurement data to control a handover procedure.

33 Claims, 4 Drawing Sheets

(56) References Cited

U.S. PATENT DOCUMENTS

| | | | |
|---|---|---|---|
| 6,845,238 B1* | 1/2005 | Muller | 455/436 |
| 2004/0157608 A1 | 8/2004 | Kurose et al. | |
| 2008/0188215 A1 | 8/2008 | Bergstrom et al. | |
| 2009/0047953 A1* | 2/2009 | Proctor | 455/435.2 |
| 2009/0270109 A1* | 10/2009 | Wang Helmersson et al. | 455/453 |
| 2009/0274117 A1* | 11/2009 | Vachhani et al. | 370/331 |
| 2010/0130212 A1* | 5/2010 | So et al. | 455/444 |
| 2011/0317576 A1* | 12/2011 | Nguyen et al. | 370/252 |

FOREIGN PATENT DOCUMENTS

| | | |
|---|---|---|
| JP | 2004-242139 A | 8/2004 |
| JP | 2008-236727 A | 10/2008 |
| WO | 2008/060236 A2 | 5/2008 |

OTHER PUBLICATIONS

Office Action, dated Jan. 15, 2014, issued by the Japanese Patent Office, in counterpart Application No. 2011-540634.

* cited by examiner

CELL MEASUREMENT DEVICE AND PROCESS

CROSS REFERENCE TO RELATED APPLICATIONS

This application is a National Stage of International Application No. PCT/JP2010/055983 filed Mar. 25, 2010, claiming priority based on United Kingdom Patent Application No. 0905395.0 filed Mar. 30, 2009, the contents of all of which are incorporated herein by reference in their entirety.

TECHNICAL FIELD

The present invention relates to cellular communication devices. The invention has particular relevance to cellular devices that operate in accordance with the ETSI and 3GPP standards, such as the GSM standards, UTRAN standards and the Long Term Evolution (LTE) of UTRAN (called Evolved Universal Terrestrial Radio Access Network (E-UTRAN)) standards.

BACKGROUND ART

There are a number of different cellular telephone standards, such as GSM, UMTS, LTE that define different operating frequencies and protocols to allow user equipment (UE) to communicate with other user equipment via the telephone network. Many UEs are able to operate using a number of these different standards and typically will register with the network node that provides the best signal strength and the best service level. However, as the UE moves, it will re-register itself with different network nodes, which may operate using different technology. For example, the UE may initially be registered with an LTE network node and may move out of coverage of that node into the cell coverage of a UMTS network node. Such a handover procedure is called "inter-RAT" handover as the UE changes the Radio Access Technology (RAT) during the handover. According to the current 3GPP standards, it is the responsibility of the network nodes to determine when a UE should handover to another network node. The network node makes this decision based on measurements provided by the UE for a number of candidate neighbouring cells (defined in a neighbour cell list) provided to the UE by the network node.

It is assumed that the network nodes, such as the base stations, know the capabilities and the current status of the user equipment (UE) registered therewith, and that therefore the network nodes can manage traffic gaps (directly or indirectly, depending on the technology) to allow the UEs time to make the measurements and send the network nodes corresponding measurement reports. If the UE does not send a measurement report within the defined reporting time, the network node may assume that the candidate cells are not visible to the UE and may immediately change the list of candidate cells and sends the new cell list to the UE. The current standards require the UE to obey the latest command, and so it will discard the original cell list and will start to make measurements in respect of the new cell list.

However, a problem has been found with this procedure. In particular, if the network node overestimates the UE multi-mode capabilities or if the reported UE capabilities do not match the real time circumstances of the moment, the network node may define too short a reporting period. As a result, the UE may not have enough time to make the measurements and report the results in the defined time. The inventors have therefore, realised that strict obedience to the latest periodic measurement command could lead to a sub-optimal handover. For example, if the best cell is in the original cell list, then it would be discarded from the handover decision when the network node issues the new cell list. In future, networks are even more likely to "get it wrong" as the number of RATs increases and the combinations of UE capabilities and network features multiply, networks might not be able to predict precisely when a measurement ought to be possible by a particular UE. One solution is to give the UEs a longer reporting period, but this will mean less efficiency.

DISCLOSURE OF THE INVENTION

The present invention proposes, in the above situation, to allow the UE to continue working with the original neighbour cell list, at least until it has considered all cells once. The subsequent cell list would not be ignored and the UE might be arranged to report measurements of cells from both lists. The network node must also be configured to accept measurements of cells which are no longer on the current cell list. This option might be limited to the point when the UE has completed or at least attempted to complete all measurements for the original cell list.

According to one aspect, the invention provides a cellular communications device comprising means for receiving a first measurement control command including a first neighbour cell list, means for receiving a second measurement control command including a second neighbour cell list, means for obtaining cell measurements for cells identified in received cell lists, and means for generating, after receiving said second measurement control command, a measurement report including cell measurements for cells included in said first cell list which are not included in said second cell list. If the cellular device lags behind the network, it may be arranged to maintain and obtain measurements for cells on three or more lists.

In one embodiment, the generating means generates a measurement report including cell measurements for cells included in the first cell list and for cells included in the second cell list. The cells included in the second cell list are typically different to the cells included in said first cell list, although this is not essential.

Cell measurements for cells in the first cell list may be obtained before and/or after receipt of the second measurement command. A single measurement report including all measurements for all cells in the first and second cell lists may be sent by the device or alternatively, a sequence of reports may be sent. In the latter case, cell measurements for the best candidate cells are preferably transmitted before cell measurements for other cells.

In order to keep track of the different cells in the first and the second cell lists, the cell lists can be stored as separate lists within the device. Alternatively, the lists maybe aggregated if desired.

The present invention also provides a network communications node operable to communicate with one or more cellular communication devices, the network communications node comprising means for outputting a first measurement control command including a first neighbour cell list, means for outputting a second measurement control command including a second neighbour cell list, and means for receiving, after outputting said second measurement control command, a measurement report from a mobile communication device, a measurement report including cell measurements for cells included in said first cell list which are not included in said second cell list.

The received measurement report may include cell measurements for cells included in the first cell list and for cells included in the second cell list.

In a preferred embodiment, the network communications node determines a target network communications node for a handover procedure using the cell measurements within the received measurement report(s).

As the network communications node may receive cell measurements for cells contained in the first cell list but not the second cell list, the network communications node may maintain the first cell list after outputting the second cell list.

The present invention also provides corresponding methods and a computer implementable instructions product comprising computer implementable instructions for causing a programmable computer device to become configured as the above mobile device or as the above network node. The product may include a computer readable medium or a signal that carries the instructions.

BRIEF DESCRIPTION OF THE DRAWINGS

These and various other aspects of the invention will become apparent from the following detailed description of embodiments which are described, by way of example only, with reference to the accompanying Figures in which.

BEST MODE FOR CARRYING OUT THE INVENTION

Overview

Figure 1:
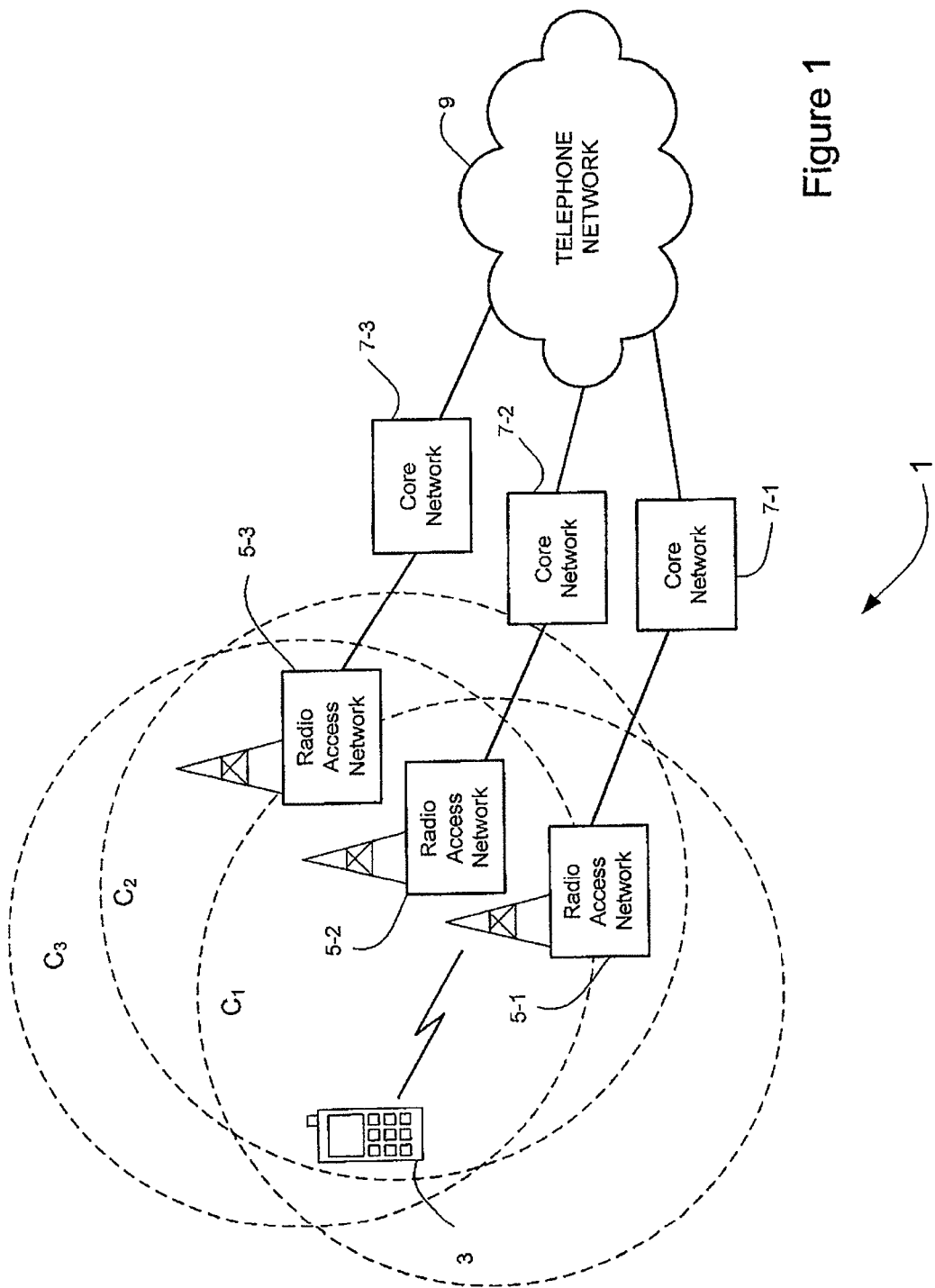
FIG. 1 schematically illustrates a mobile telecommunication system of a type to which the embodiment is applicable.

FIG. 1 schematically illustrates part of a mobile (cellular) telecommunications system 1 having a mobile telephone 3, three radio access networks 5-1, 5-2 and 5-3 and corresponding core networks 7-1, 7-2 and 7-3. Each of the radio access networks 5 operates to communicate with mobile telephones 3 within a respective cell, which are illustrated in FIG. 1 by the dashed circles labeled $C_1$, $C_2$ and $C_3$ respectively. In this embodiment, radio access network 5-1 is an E-UTRAN access network, radio access network 5-2 is a UMTS access network and radio access network 5-3 is a GSM access network. In this embodiment, the mobile telephone 3 is a multi-RAT device that can connect with E-UTRAN cells, UMTS cells and GSM cells. In the illustrated Figure, the mobile telephone 3 is within the all of the cells and so can therefore connect with any of the three radio access networks 5 to be able to communicate with other users (not shown) via the selected radio access network 5, its associated core network 7 and the telephone network 9.

Radio Access Network & Core Network

Figure 2:
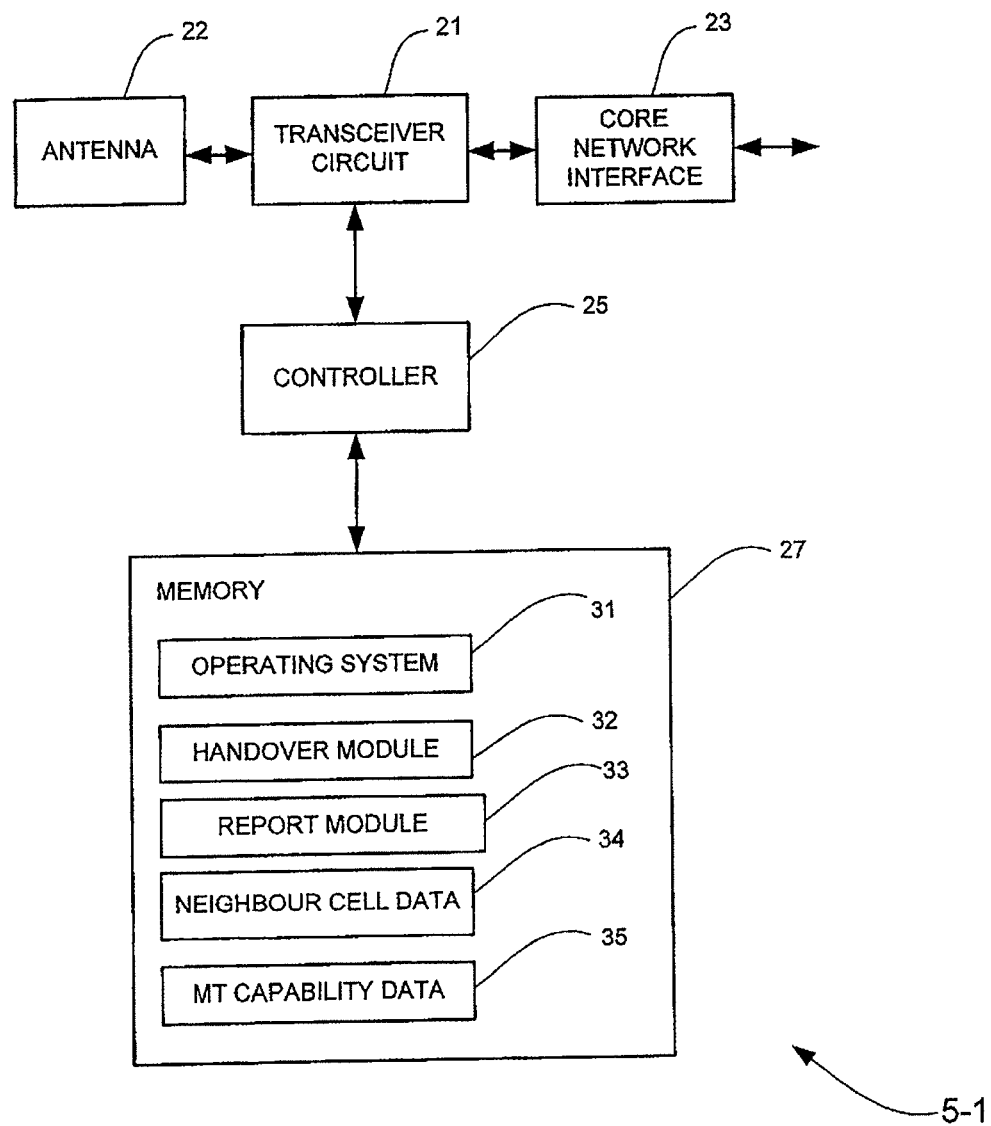
FIG. 2 is a block diagram illustrating components of a network base station forming part of the system shown in FIG. 1.

Although each radio access network 5 may operate a number of different cells, each providing different services to the mobile telephone 3, in this embodiment it will be assumed, for simplicity, that each radio access network 5 operates a single cell. In the case of E-UTRAN, the radio access network 5-1 is formed by a base station (referred to as an eNodeB or just eNB) and it is the base station's operation to instruct the mobile telephone 3 to make the cell measurements so that it can make the appropriate handover decision. In other radio access networks the operation for instructing the mobile telephone 3 to perform the cell measurements may fall to some other network node in the radio access network or in the core network 7. For ease of description, however, in this embodiment, it will be assumed that the mobile telephone 3 is associated with the E-UTRAN base station 5-1 and the main components of this base station 5-1 are illustrated in FIG. 2. As shown, the base station 5-1 includes a transceiver circuit 21 which is operable to transmit signals to and to receive signals from the mobile telephone 3 via one or more antennae 22 and which is operable to transmit signals to and to receive signals from the core network 7-1 via a core network interface 23. The base station 5-1 also includes a controller 25 which controls the operation of the base station 5-1 in accordance with software stored in memory 27. The software includes, among other things, an operating system 31, a handover module 32 and a report module 33. The handover module 32 is operable to control the handover of the mobile telephone 3 to another cell. The report module 33 is operable to command the mobile telephone 3 to perform inter-RAT measurements and to provide those measurements to the base station 5-1 within a defined time, so that this information can be used by the handover module 32 to identify the best target cell for the handover.

The memory 27 also stores various data including neighbour cell data 34 and mobile telephone (MT) capability data 35. The report module 33 uses the neighbour cell data 34 to identify to the mobile telephone 3 the cells for which measurements are to be obtained. The report module 33 uses the MT capability data 35 to calculate an appropriate report time by which the mobile telephone 3 is expected to provide a measurement report.

Mobile Telephone

Figure 3:
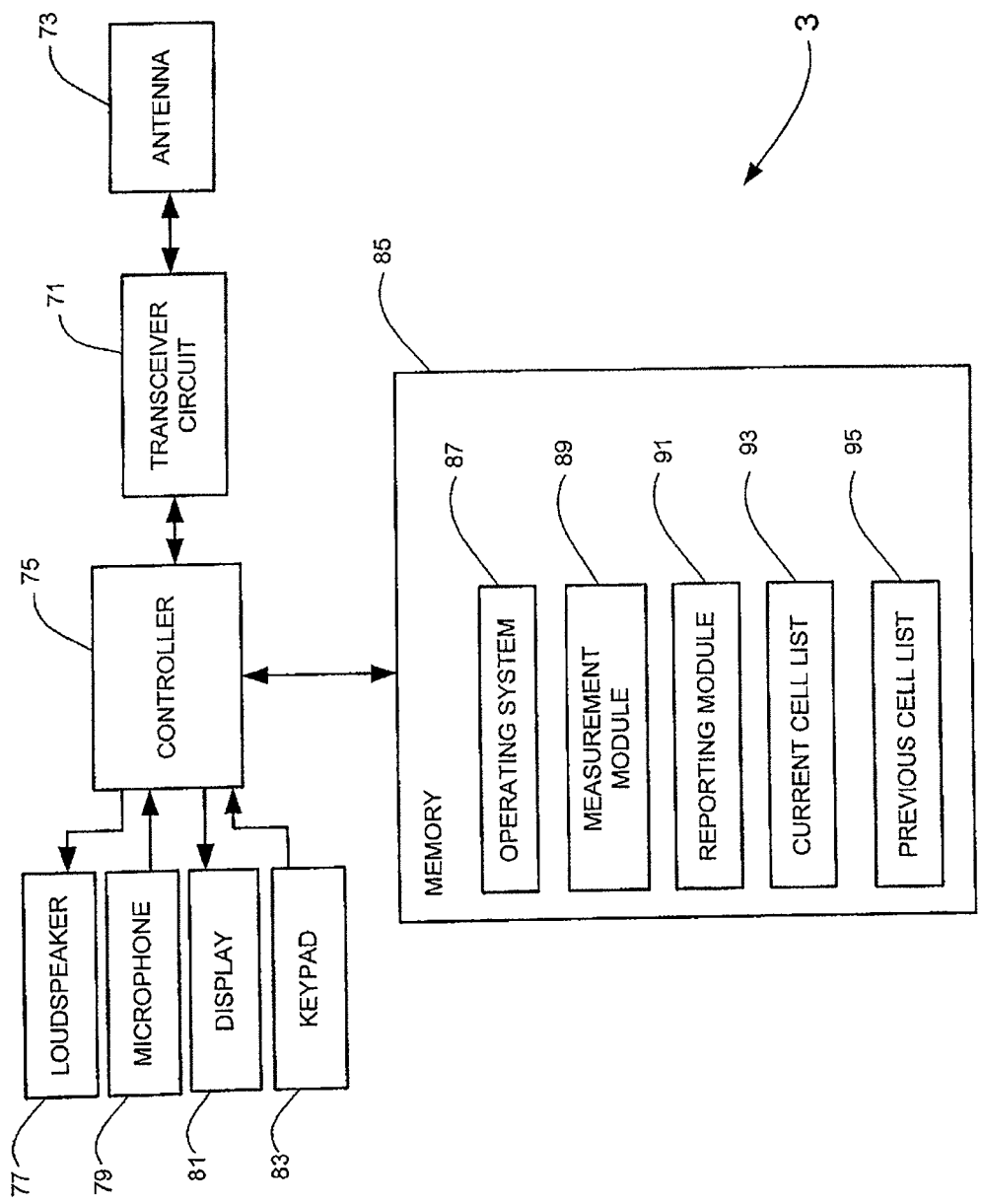
FIG. 3 is a block diagram illustrating components of a mobile communication device forming part of the system shown in FIG. 1.

FIG. 3 schematically illustrates the main components of the mobile telephone 3 shown in FIG. 1. As shown, the mobile telephone 3 includes a transceiver circuit 71 that is operable to transmit signals to and to receive signals from a radio access network 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software modules stored within memory 85. As shown, these software modules include, among other things, an operating system 87, a measurement module 89 and a reporting module 91. In response to receiving a command from the base station 5-1, the reporting module 91 is operable to make the measurement module 89 obtain the desired measurements and to send the measurements to the base station 5-1. The memory 85 also stores a current cell list 93 and any previous cell list 95. The reporting module 91 stores the latest received neighbour cell list as the current cell list 93 and it stores any previous cell list for which measurements have yet to be completed as the previous cell list 95. These lists are used by the measurement module 89 to identify the cells for which measurements are to be obtained and are used by the report module to identify the cells for which measurement reports are to be sent to the base station 5-1.

In the above description, both the base station 5-1 and the mobile telephone 3 are described, for ease of understanding, as having various discrete software modules. Whilst these software modules may be provided in this way for certain applications, for example where an existing system has been modified to implement the invention, in other applications, for example in systems designed with the inventive features in mind from the outset, the functionalities of, these modules may be performed by a single module or they may be built into the overall operating system or code and so these modules may not be discernible as discrete entities.

Operation

Figure 4:
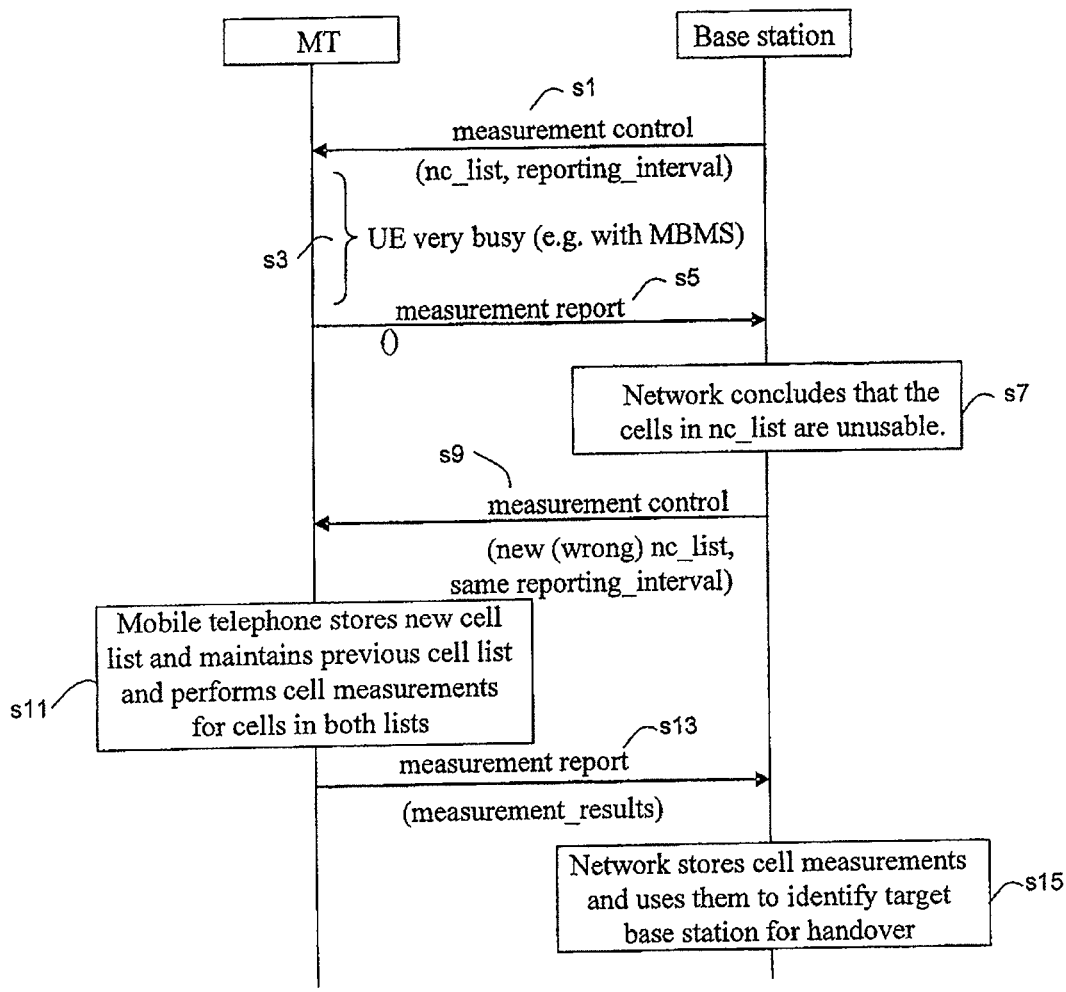
FIG. 4 is a timing diagram illustrating the data flow between the mobile communication device and the base station shown in FIG. 1.

The operation of the present embodiment will now be described with reference to the timing diagram shown in FIG. 4. As shown, the process starts when the base station 5-1 sends, in step s1, the mobile telephone 3 a measurement control command asking the mobile telephone 3 to report to it at one or more specified reporting times (specified in the command by a reporting interval—reporting_interval) with measurements for neighbouring cells (specified in the command—nc_list). The base station 5-1 determines the reporting interval based on the capability data 35 it has stored for the mobile telephone 3 and it determines the cells to include in the neighbour cell list based on pre-stored neighbour cell data 34. In response to receiving this command, the mobile telephone 3 records the reporting interval and stores the neighbour cells as the current cell list 93. In this example, as illustrated at step s3, at the time that this command is received by the mobile telephone 3, the telephone 3 is busy (for example the base station 5-1 may have provided a reporting interval which is too close to a Multimedia Broadcast Multicast Service (MBMS) resource which the user of the mobile telephone 3 has unilaterally selected (ie without knowledge of the network), so the mobile cannot make full use of the reporting interval due to frequency switching delays) and so is unable to obtain the desired measurements and report them to the base station 5-1 by the first reporting opportunity. Therefore, at the first reporting opportunity the mobile telephone 3 reports no cell information at step s5. As illustrated in step s7, in this case, the base station 5-1 maintains the current assumption that the cells in the original cell list (nc_list) are unusable by the mobile telephone 3. Consequently, the base station 5-1 sends, in step s9, another measurement control command specifying a new nc_list and the same reporting interval. The base station 5-1 stores the original neighbour list as a previous cell list in the neighbour cell data 34 and stores the new nc_list as the current cell list in the neighbour cell data 34.

In this embodiment, when the mobile telephone 3 receives the new measurement control command, it does not drop the original neighbour list, but instead copies it to previous cell list 95 and then stores the new neighbour cell list received with the new command to the current cell list 93. The mobile telephone 3 then obtains, in step s11, measurements for the cells identified in the current cell list 93 and measurements for the cells identified in the previous cell list 95. The obtained measurements are then sent, in step s13, to the base station 5-1 in a measurement report. In step s15, the base station 5-1 stores the cell measurement data for the different cells in the neighbour cell data 34 and then uses this information to decide whether or not a handover should be performed and, if so, with which target cell.

Thus the present embodiment requires changes to be made to the existing standards. In particular, the standard must be adapted to allow the mobile telephone 3 to continue considering cells on the original cell list. Additionally, the standard must be adapted to allow the base station 5-1 to accept and take into account measurements of cells which are no longer in the current neighbour cell list. To minimize the impact on the standards, these changes may be restricted to a relatively short period of time, for example until the point in time when the mobile telephone 3 has completed or attempted to complete all measurements for the original cell list.

Modifications and Alternatives

A detailed embodiment has been described above. As those skilled in the art will appreciate, a number of modifications and alternatives can be made to the above embodiment whilst still benefiting from the invention embodied therein. By way of illustration only a number of these alternatives and modifications will now be described.

In the above embodiment, the mobile telephone was able to report cells identified in both a previous measurement command and a current measurement command. Depending on the applicable radio access network 5 to which the mobile telephone is currently attached, there may be a limit on the number of cells for which measurements can be reported in each measurement opportunity. In this case, the mobile telephone 3 will report the measurements over a number of consecutive reporting opportunities. Preferably, the mobile telephone will report the best candidate cells first, although it may instead report the cells from the earlier command first to resolve the discrepancy as soon as possible.

In the above embodiment, the base station maintained both a current neighbour cell list and a previous cell list. As those skilled in the art will appreciate, this is not essential. The base station may be configured to keep a record of the current cell list and to add cells to that list for any cell measurements that are received from the mobile telephone in respect of cells that are not on the current cell list. In either case, as long as the base station (or other network node) is configured to accept measurements for cells that are not on the current cell list, and to use those measurements to determine the best handover target, the problem with the existing systems can be addressed.

In the above embodiment, the base station was responsible for issuing the measurement commands and for deciding on the handover. As those skilled in the art will appreciate, this functionality may be performed by some other network node in other radio access technologies.

In the above embodiment, the mobile telephone maintained a current cell list and a previous cell list. As those skilled in the art will appreciate, if the mobile telephone lags further behind the network node, then the mobile telephone may maintain more than one previous cell list.

In the above embodiments, a number of software modules were described. As those skilled in the art will appreciate, the software modules may be provided in compiled or un-compiled form and may be supplied to the core network, radio access network or to the mobile telephone as a signal over a computer network, or on a recording medium. Further, the functionality performed by part or all of this software may be performed using one or more dedicated hardware circuits. However, the use of software modules is preferred as it facilitates the updating of radio access network 5 and the mobile telephone 3 in order to update their functionalities.

In the above embodiment, a mobile telephone was provided that communicated with a number of radio access networks. As those skilled in the art will appreciate, the invention is applicable to other types of user equipment (UE) such as laptop computers, Personal Digital Assistants or other hand held portable computer devices.

In the above embodiment, each radio access network was connected to its own core network 7. As those skilled in the art will appreciate, a cell can be part of a network sharing architecture in which there may be several core networks 7 that use the same cell or there may be several cells (of different RATs) that operate in connection with the same core network.

This application is based upon and claims the benefit of priority from United Kingdom patent application No.

0905395.0, filed on Mar. 30, 2009, the disclosure of which is incorporated herein in its entirety by reference.

The invention claimed is:

1. A cellular communications device comprising:
    means for receiving a first measurement control command including a first neighbour cell list;
    means for receiving a second measurement control command, after receiving said first measurement control command, the second measurement control command including a second neighbour cell list;
    means for obtaining cell measurements for cells identified in received neighbour cell lists; and
    means for generating, after receiving said second measurement control command, a measurement report including cell measurements for cells included in said first neighbor cell list that are not included in said second neighbour cell list,
    wherein said generating means is configured to generate a single measurement report including cell measurements for all cells in said first and second neighbour cell lists.

2. The device according to claim 1, wherein said generating means is configured to generate a measurement report including cell measurements for cells included in said first neighbour cell list and for cells included in said second neighbour cell list.

3. The device according to claim 1, wherein the cells included in said second neighbour cell list are different from the cells included in said first neighbour cell list.

4. The device according to claim 1, wherein said means for obtaining cell measurements is configured to obtain cell measurements for cells in said first neighbour cell list after receipt of the second measurement command.

5. The device according to claim 1, wherein said generating means is configured to generate a sequence of measurement reports, each including cell measurements for a subset of the cells in said first and second neighbour cell lists.

6. The device according to claim 1, operable to receive one or more further measurement control commands and wherein said generating means is configured to generate said measurement report including cell measurements for cells included in said first neighbour cell list after receiving said one or more further measurement control commands.

7. The device according to claim 1, comprising means for transmitting the measurement report to a remote network node.

8. The device according to claim 1, comprising means for maintaining said first neighbour cell list after receiving said second neighbour cell list.

9. A method performed by a cellular communications device comprising:
    receiving a first measurement control command including a first neighbour cell list;
    receiving a second measurement control command, after receiving said first measurement control command, the second measurement control command including a second neighbour cell list;
    obtaining cell measurements for cells identified in received neighbour cell lists; and
    generating, after receiving said second measurement control command, a measurement report including cell measurements for cells included in said first neighbor cell list which are not included in said second neighbour cell list,
    wherein said generating generates a single measurement report including cell measurements for all cells in said first and second neighbour cell lists.

10. The method according to claim 9, wherein said generating generates a measurement report including cell measurements for cells included in said first neighbour cell list and for cells included in said second neighbour cell list.

11. The method according to claim 9, wherein the cells included in said second neighbour cell list are different from the cells included in said first neighbour cell list.

12. The method according to claim 9, wherein said obtaining obtains cell measurements for cells in said first neighbour cell list after receipt of the second measurement command.

13. The method according to claim 9, wherein said generating generates a sequence of measurement reports, each including cell measurements for a subset of the cells in said first and second neighbour cell lists.

14. The method according to claim 9, comprising receiving one or more further measurement control commands and wherein said generating generates said measurement report including cell measurements for cells included in said first neighbour cell list after receiving said one or more further measurement control commands.

15. The method according to claim 9, comprising transmitting the measurement report to a remote network node.

16. The method according to claim 9, comprising maintaining said first neighbour cell list after receiving said second neighbour cell list.

17. A network communications node configured to communicate with one or more cellular communication devices, the network communications node comprising:
    means for outputting a first measurement control command including a first neighbour cell list;
    means for outputting a second measurement control command including a second neighbour cell list; and
    means for receiving, after outputting said second measurement control command, a measurement report from a mobile communications device, the measurement report including cell measurements for cells included in said first neighbour cell list which are not included in said second neighbour cell list,
    wherein said generating generates a single measurement report including cell measurements for all cells in said first and second neighbour cell lists.

18. The network communications node according to claim 17, wherein said receiving means is configured to receive a measurement report including cell measurements for cells included in said first neighbour cell list and for cells included in said second neighbour cell list.

19. The network communications node according to claim 17, wherein the cells included in said second neighbour cell list are different from the cells included in said first neighbour cell list.

20. The network communications node according to claim 17, wherein said receiving means is configured to receive a sequence of measurement reports, each including cell measurements for a subset of the cells in said first and second neighbour cell lists.

21. The network communications node according to claim 17, configured to transmit one or more further measurement control commands and wherein said receiving means is configured to receive said measurement report including cell measurements for cells included in said first neighbour cell list after transmitting said one or more further measurement control commands.

22. The network communications node according to claim 17, comprising means for determining a target network communications node for a handover procedure using the cell measurements within the received measurement report.

23. The network communications node according to claim 17, comprising means for maintaining said first neighbour cell list after outputting said second neighbour cell list.

24. A method performed by a network communications node that communicates with one or more cellular communication devices, the method comprising:
   outputting a first measurement control command including a first neighbour cell list;
   outputting a second measurement control command including a second neighbour cell list; and
   receiving, after outputting said second measurement control command, a measurement report from a mobile communications device, the measurement report including cell measurements for cells included in said first neighbour cell list which are not included in said second neighbour cell list, wherein said receiving receives a single measurement report including cell measurements for all cells in said first and second neighbour cell lists.

25. The method according to claim 24, wherein said receiving receives a measurement report including cell measurements for cells included in said first neighbour cell list and for cells included in said second neighbour cell list.

26. The method according to claim 24, wherein the cells included in said second neighbour cell list are different from the cells included in said first neighbour cell list.

27. The method according to claim 24, wherein said receiving receives a sequence of measurement reports, each including cell measurements for a subset of the cells in said first and second neighbour cell lists.

28. The method according to claim 24, comprising transmitting one or more further measurement control commands and wherein said receiving receives said measurement report including cell measurements for cells included in said first neighbour cell list after transmitting said one or more further measurement control commands.

29. The method according to claim 24, comprising determining a target network communications node for a handover procedure using the cell measurements within the received measurement report.

30. The method according to claim 24, comprising maintaining said first neighbour cell list after outputting said second neighbour cell list.

31. A cellular communications device comprising:
   a transceiver circuit configured to receive a first measurement control command including a first neighbour cell list and configured to receive a second measurement control command, after receiving said first measurement control command, the second measurement control command including a second neighbour cell list; and
   a processor configured to obtain cell measurements for cells identified in received neighbour cell lists; and to generate, after receiving said second measurement control command, a measurement report including cell measurements for cells included in said first neighbour cell list which are not included in said second neighbour cell list,
   wherein said processor is configured a single measurement report including cell measurements for all cells in said first and second neighbour cell lists.

32. A network communications node configured to communicate with one or more cellular communication devices, the network communications node comprising:
   a transceiver configured to output a first measurement control command including a first neighbour cell list and to output a second measurement control command including a second neighbour cell list; and
   a processor configured to receive, after outputting said second measurement control command, a measurement report from a mobile communications device, the measurement report including cell measurements for cells included in said first neighbour cell list which are not included in said second neighbour cell list,
   wherein said processor is configured a single measurement report including cell measurements for all cells in said first and second neighbour cell lists.

33. A non-transitory computer-readable recording medium comprising computer implementable instructions for causing a programmable computer device to perform the method of claim 9.

* * * * *